(12) United States Patent
Hillen et al.

(10) Patent No.: US 7,643,890 B1
(45) Date of Patent: Jan. 5, 2010

(54) REMOTE MANAGEMENT OF PORTABLE CONSTRUCTION DEVICES

(75) Inventors: Edward D. Hillen, Painesville, OH (US); Stephen M. Kainec, South Euclid, OH (US); William T. Matthews, Chesterland, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 667 days.

(21) Appl. No.: 11/034,665

(22) Filed: Jan. 13, 2005

(51) Int. Cl.
| | |
|---|---|
| G05B 23/02 | (2006.01) |
| G05B 19/00 | (2006.01) |
| G08B 17/06 | (2006.01) |
| G08B 5/22 | (2006.01) |
| G05D 1/10 | (2006.01) |
| G05B 11/01 | (2006.01) |
| G05B 15/00 | (2006.01) |
| G01C 9/00 | (2006.01) |
| G06F 11/00 | (2006.01) |

(52) U.S. Cl. .......................... 700/17; 700/83; 700/302; 340/3.1; 340/5.33; 340/539.13; 340/825.36; 340/825.49; 702/150; 702/188

(58) Field of Classification Search .................... 700/9, 700/17, 19, 65, 83, 284, 302; 701/1–2, 50, 701/213; 340/3.1, 3.9, 988–989, 5.33, 539.13, 340/825.36, 825.49; 702/150, 188
See application file for complete search history.

(56) References Cited

U.S. PATENT DOCUMENTS

| | | | |
|---|---|---|---|
| 5,276,305 A | | 1/1994 | Hsien |
| 5,353,216 A | * | 10/1994 | Ayers et al. .................. 363/144 |
| 5,719,563 A | | 2/1998 | Thompson, Jr. |
| 5,932,123 A | * | 8/1999 | Marhofer et al. ....... 219/130.01 |
| 6,040,555 A | | 3/2000 | Tiller et al. |
| 6,044,316 A | | 3/2000 | Mullins |
| 6,479,792 B1 | * | 11/2002 | Beiermann et al. ....... 219/130.5 |

(Continued)

FOREIGN PATENT DOCUMENTS

AU 199922569 B2 3/1999

(Continued)

OTHER PUBLICATIONS

"Remote Coordinated Controls in Multiple Telerobot Cooperation"; Chong et al., Apr. 2000, IEEE, pp. 3138-3143.*

(Continued)

*Primary Examiner*—Ronald D Hartman, Jr.
(74) *Attorney, Agent, or Firm*—Turocy & Watson, LLP (57) ABSTRACT

The present invention leverages a co-located communication component to provide remote management of a portable construction device. This enables monitoring and/or controlling the portable construction device from a central management site. The communication component allows the central site, or another communication component, to interact with the portable construction device to retrieve information such as, for example, usage information and/or status information. The communication component also allows remote control of the devices such as, for example, remote power control and/or control of auxiliary devices that facilitate the functionality of the portable construction devices. The present invention can also incorporate global positioning systems and/or location indicating systems to facilitate in determining where the portable construction devices are located and/or when the devices are properly positioned. The systems themselves can be distributed to form a communication network with bi-directional communication capabilities.

20 Claims, 8 Drawing Sheets

U.S. PATENT DOCUMENTS

| | | | |
|---|---|---|---|
| 6,518,995 B1 | 2/2003 | Ghole | |
| 6,590,184 B1 * | 7/2003 | Andersen | 219/136 |
| 6,614,361 B1 | 9/2003 | Kinugawa | |
| 6,624,388 B1 * | 9/2003 | Blankenship et al. | 219/130.5 |
| 6,770,839 B2 | 8/2004 | Mangiarino et al. | |
| 6,778,097 B1 * | 8/2004 | Kajita et al. | 340/825.69 |
| 6,782,644 B2 | 8/2004 | Fujishima et al. | |
| 6,797,921 B1 * | 9/2004 | Niedereder et al. | 219/130.5 |
| 6,803,854 B1 * | 10/2004 | Adams et al. | 340/531 |
| 6,977,357 B2 * | 12/2005 | Hsu et al. | 219/130.01 |
| 2002/0168937 A1 | 11/2002 | Clark et al. | |
| 2004/0026392 A1 | 2/2004 | Feichtinger et al. | |
| 2004/0162630 A1 | 8/2004 | Hillen et al. | |
| 2004/0232128 A1 | 11/2004 | Niedereder et al. | |
| 2005/0006363 A1 * | 1/2005 | Hsu et al. | 219/130.01 |
| 2005/0197115 A1 * | 9/2005 | Clark et al. | 455/426.1 |
| 2006/0027546 A1 | 2/2006 | Reynolds et al. | |

FOREIGN PATENT DOCUMENTS

| | | | |
|---|---|---|---|
| CH | 652634 A5 * | 11/1985 | |
| EP | 1112800 | * | 4/2001 |
| EP | 1112800 | | 7/2001 |
| EP | 1 112 800 B1 | | 12/2005 |
| JP | 11320093 A | * | 11/1999 |

OTHER PUBLICATIONS

"Tele-presence information and remote-controlled task execution"; Minamoto et al., Oct. 1998, IEEE, pp. 1102-1106.*

"Remote Control and Robotics in Construction Engineering"; Wen et al., Feb. 8, 1991; IEEE, pp. 1429-1432.*

"Remote Control and Monitoring over the Internet—Wireless Construction Site"; Leila Rannanjarvi; Jan. 2003; ERCIM news No. 52, pp. 1-3.*

Dictionary.com defintion for "portable"; Mar. 2, 2006; p. 1.*

Google Translation of EP 1 112 800 A1; pp. 1-7, Jul. 26, 2006.*

English translation for JP11320093A; 2 pages; printed from EAST on Jun. 30, 2009.*

English translation for CH652634A5; 1 page; printed from EAST on Jun. 30, 2009.*

European Search Report dated Jun. 7, 2006 for European Patent Application Serial No. EP 06 00 0042, 4 pages.

AU OA dated Jul. 16, 2008 for Australian Patent Application No. 2006200011, 2 pages.

MX OA dated May 20, 2009 for Mexican Patent Application No. PA/a/2006/000493, 2 pages.

* cited by examiner

REMOTE MANAGEMENT OF PORTABLE CONSTRUCTION DEVICES

TECHNICAL FIELD

The present invention relates generally to portable construction devices and, more particularly, to systems and methods for remotely managing portable welding systems on a construction site.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of a construction process.

For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. These systems are often deployed over great distances in larger construction environments and many times are spread across multiple locations. Given the nature and requirements of modern and more complex construction operations however, welding systems designers, architects and suppliers face increasing challenges in regard to upgrading, maintaining, controlling, servicing and supplying various welding locations. Unfortunately, many conventional welding systems operate in individually controlled and somewhat isolated locations in regard to the overall construction process. Thus, controlling, maintaining, servicing and supplying multiple and isolated locations in large centers, and/or across the globe, has become more challenging, time consuming and expensive.

One such challenge relates to managing information and placement of welding equipment. For example, a customer may desire to construct various projects in remote areas, requiring welding units that are separated by great distances. Conventionally, welding unit operation and status information is contained independently with each welding unit. The customer must physically check each unit and report back to a construction management site with this information. This is very time consuming and can provide inaccurate information depending on the length of time it takes for the information to be reported back. If traveling to various locations takes several hours, then the data will not include usage information for that time period. Additionally, if the equipment is leased out to a job site, the lessee must trust that the customer will accurately report back the usage and location of the equipment. Thus, it is highly desirable to be able to manage these assets in a reliable and efficient manner to increase productivity and to ensure maximum revenue generation.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates generally to portable construction devices and, more particularly, to systems and methods for remotely managing portable welding systems on a construction site. A co-located communication component is leveraged to provide remote management of a portable construction device such as, for example, a welding unit. This provides a means to monitor and/or control the portable construction device from a central management site such as, for example, a construction job site office. The communication component allows the central site, and/or another communication component, to interact with the portable construction device to retrieve such information as, for example, usage information and/or status information. The communication component also allows remote control of the devices such as, for example, remote power control and/or control of auxiliary devices that facilitate the functionality of the portable construction devices. Communication with these devices facilitates such activities as distributed control, maintenance, customer support, and/or order/supply/distribution of welding materials and the like. Thus, the present invention promotes a new generation of intelligent welding management methods and systems that improve upon conventional portable construction systems in favor of higher-level integration to achieve improved quality, productivity, and lower cost construction.

The present invention can also incorporate global positioning systems and/or location indicating systems to facilitate in determining where the portable construction devices are located and/or when the devices are properly positioned. The systems themselves can be distributed to form a communication network with each communication component functioning as a communication node. Thus, the present invention can also utilize bi-directional communications as well as uni-directional communications. The flexibility of the present invention allows substantial increases in the optimization of construction assets by allowing easy coordination and/or locating of the assets within a construction job site. It can also facilitate in controlling usage and tracking costs/supply issues for a portable construction device.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

As used in this application, "system" is a structure comprising one or more components. A "component" is a structure comprising computer hardware and/or software. For example, a component can be, but is not limited to, a computer readable memory encoded with software instructions or a computer configured to carry out specified tasks. By way of illustration, both an application program stored in computer readable memory and a server on which the application runs can be components. Due to the nature of components, multiple components can be intermingled and are often not separate from one another. Systems can likewise be intermingled and inseparable. Further, "extranet" refers to a network of trusted trading partners communicating securely via a network that can be, but is not limited to, the Internet, a local area network, a computer network, an Intranet, a wide area network, a virtual private network, a metropolitan area network, and a wireless network.

A "welder" or "welding unit" refers to physical hardware for producing a weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source along with any controller(s), monitor(s) and communications interface(s) associated with the physical hardware. For example, a welder can be used to perform gas metal arc welding (GMAW), flux cored arc welding, metal cored arc welding, submerged arc welding (SAW), narrow groove welding, gas tungsten arc (GTAW) welding, plasma arc welding, electron beam and laser welding, hard surfacing welding, arc gouging and manual shielded arc welding (SMAW).

"Welding procedure" refers to a step or steps involved in a joining process and can include consumables to be used in the process along with settings for various aspects of a welding system before, during and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld.

The present invention provides a means of monitoring and controlling portable construction devices such as welding equipment and/or other portable construction devices. It combines portable racks of devices and/or stand-alone devices along with a means of acquiring information from them as well as the ability to manage/control them. Construction sites are most often outdoors and isolated from traditional means of factory or office local area computer networks (LANS). It is also typical for such sites to cover a relatively large area spanning from hundreds of feet (for say, office, bridge and ship building) to hundreds of miles (for say pipeline construction). Given these distances it would be highly desirable to have the ability to supervise the production activities of all the various welding cells throughout the construction site from a remote location. Typical points of control include limiting operator adjustments such as wire feed speed and voltage. Typical points of production feedback include actual arc current and voltage as well as arc hours.

Figure 1:
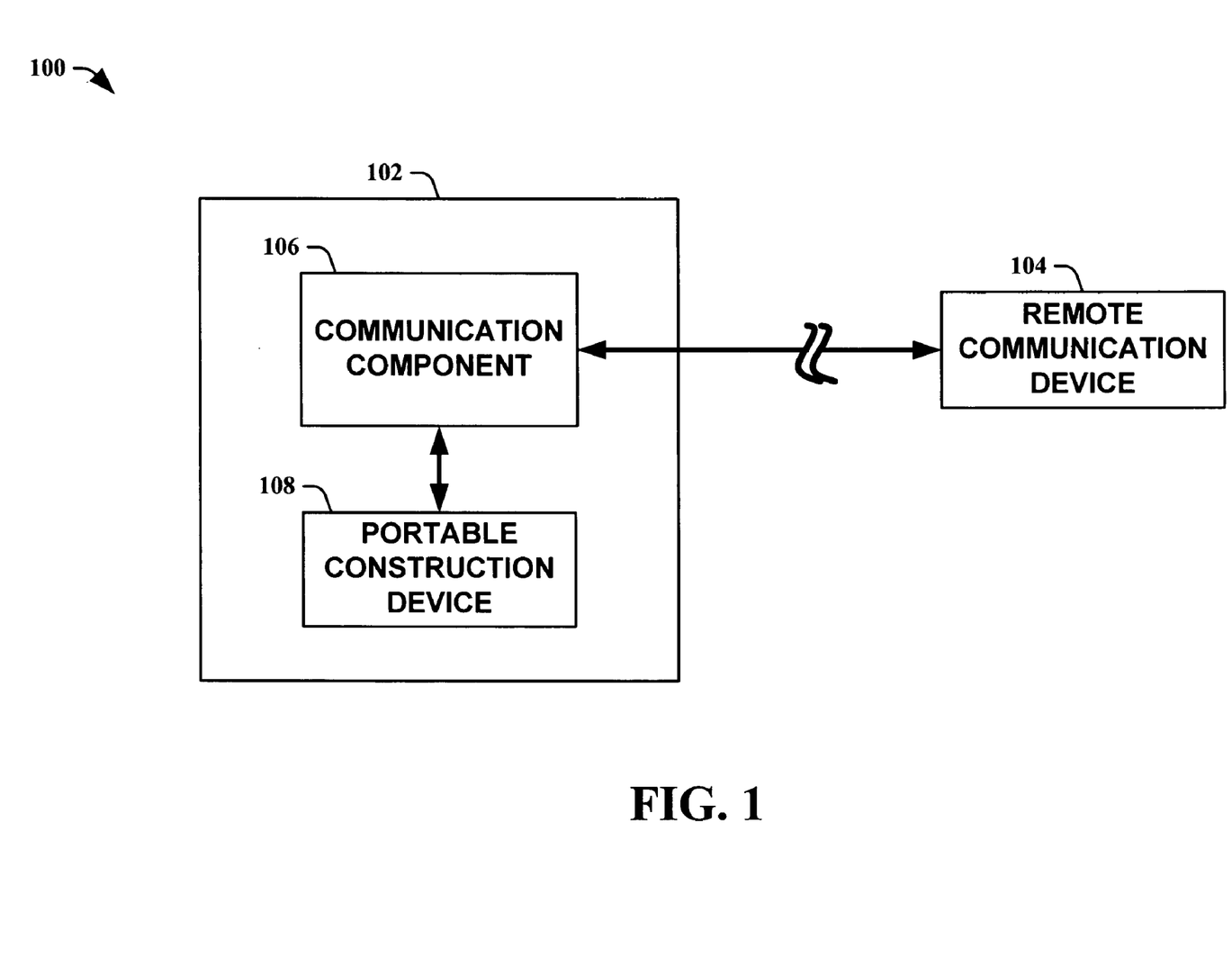
FIG. 1 is a block diagram of a portable construction device management system in accordance with an aspect of the present invention.

In FIG. 1, a block diagram of a portable construction device management system 100 in accordance with an aspect of the present invention is shown. The portable construction device management system 100 is comprised of a portable sub-system 102 (i.e., a "cell") that interacts with a remote communication device 104. The portable sub-system 102 is comprised of a communication component 106 and a portable construction device 108. The communication component 106, although illustrated in this example as a separate entity to the portable construction device 108, can also reside integral to the portable construction device 108 as well. The communication component 106 can also include digital interfaces and/or analog interfaces. This allows the present invention to facilitate communications with the remote communication device 104 for digitally enhanced devices as well as analog devices. The communication component 106 interacts with the remote communication device 104 to provide information and/or control relating to the portable construction device 108. Thus, instances of the present invention can enhance existing equipment as well as being integrated into new equipment while also providing a communication means between these differing technologies and/or to a remote location.

The remote communication device 104 can reside, for example, in a construction job site management center and receive welding related information from the communication component 106. For example, if a company leases its welding units to a job site, the company can remotely monitor the usage of each of the welding units and track charges for its usage. Runtime information and/or usage of expendable supplies can also be tracked to facilitate in keeping the welding units up and operation for extended periods of time, decreasing downtime. Additional information such as serial numbers and revision data can be utilized to determine when maintenance and/or updates are required for each device.

In another instance of the present invention, the remote communication device 104 can also be utilized to control the welding unit via the communication component 106. In this manner, for example, the power to the welding unit can be turned ON and OFF and/or power levels adjusted remotely as desired. Diagnostic commands can also be sent to the welding units. This can include queries for specific information and/or can include information requests that are received in a file, for example, that include multiple codes reflecting the state of the welding units. If no information is received as feedback, an error flag or other alert can be set and or communicated. Received diagnostic feedback can be analyzed remotely to determine the health of the welding units. For example, tables can be employed reflecting the state of certain variables at expected points in time. If the diagnostic feedback does not agree with the predetermined state information, an error flag or other alert can be issued. Any errors that are detected can be logged at the remote location if minor in nature, (e.g., occasional check sum errors) or can set an alert or contact personnel automatically if substantial welding process degradation is detected.

A group of portable sub-systems can also be utilized to create a communication network, allowing for information to be transferred between sub-systems. Additionally, the sub-systems can be linked as relay nodes to extend communications from a remote site. This can be accomplished via wireless relay links and/or wired relay links (e.g., If each unit has a limited communication cable length of, for example, 100 feet, several units can be connected serially to extend the total communication length to 1,000 feet with 10 portable sub-systems connected together serially.).

Figure 2:
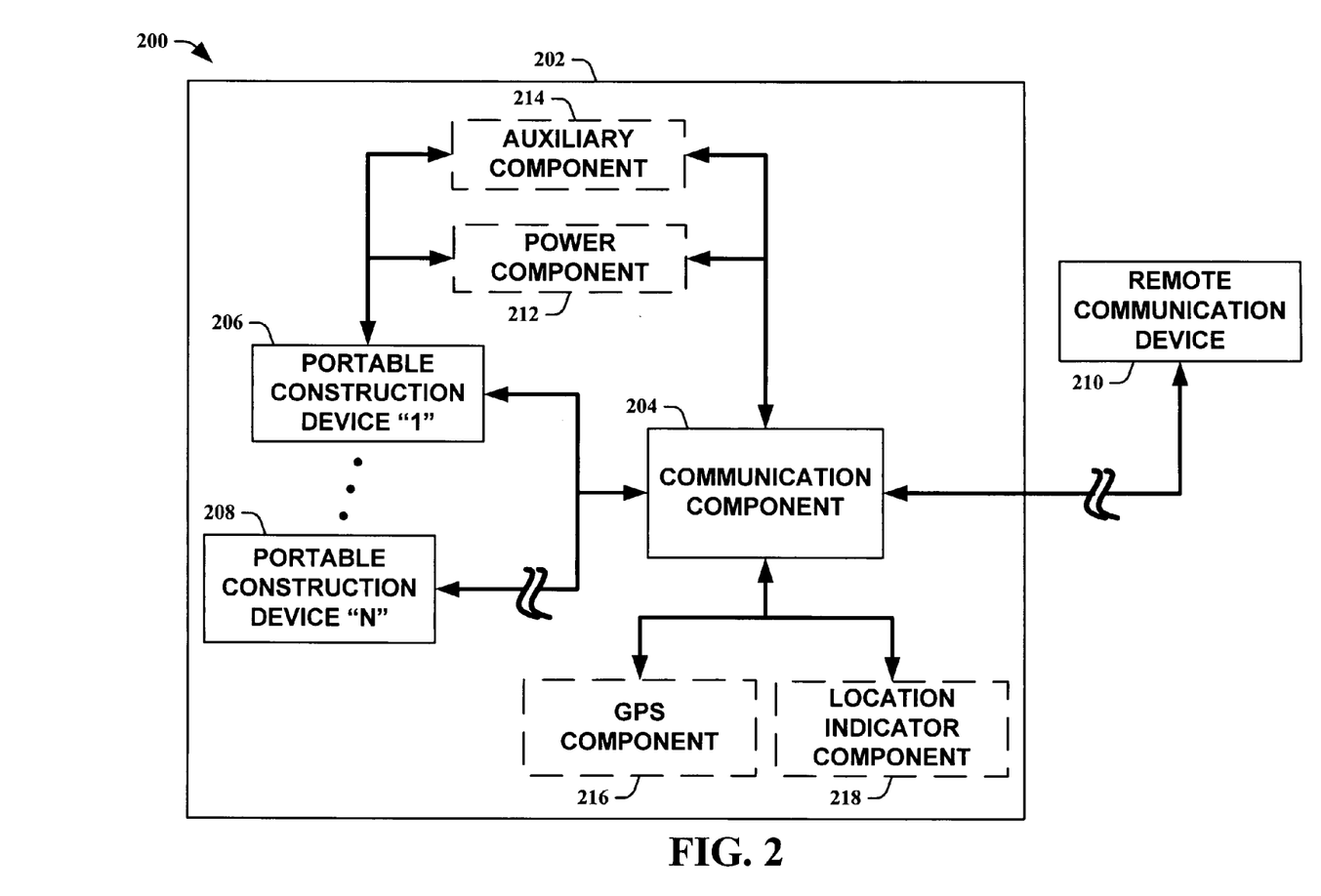
FIG. 2 is another block diagram of a portable construction device management system in accordance with an aspect of the present invention.

Referring to FIG. 2, another block diagram of a portable construction device management system 200 in accordance with an aspect of the present invention is illustrated. The portable construction device management system 200 is comprised of a portable sub-system 202 that contains a communication component 204 and portable construction devices 1-N 206-208, where N represents an integer from one to infinity. The communication component 204 interacts with a remote communication device 210 to facilitate in monitoring and/or controlling the portable construction devices 1-N 206-208. Thus, the communication component 204 can interact with a plurality of portable construction devices as well as a single device. One skilled in the art can appreciate that the communication component 204 can also reside in each of the portable construction devices 1-N 206-208 and/or reside in a single portable construction device. For example, an instance of the present invention can include a digitally enhanced portable construction device with an integral communication component that facilitates in communications with the remote communication device 210, not only for the digitally enhanced portable construction device itself, but also for other components such as analog portable construction devices and the like. In this manner, a single portable construction device can be integrated within a group of portable construction devices to provide communications for the entire group or work cell. In yet other instances of the present invention, the communication component 204 can reside with a single stand-alone portable construction device to also comprise a complete work cell.

The portable sub-system 202 can also be comprised of an optional power component 212, an optional auxiliary component 214, an optional global positioning system (GPS) component 216, and/or an optional location indicator component 218. The optional power component 212 can be, for example, a power generator that supplies power to the portable construction devices 1-N 206-208. Power to the devices 1-N 206-208 can then be selectively controlled and/or monitored by the remote communication device 210 via the communication component 204 that is co-located with the portable construction devices 1-N 206-208. This is extremely useful when portable sub-systems are located great distances apart. Their power status can be quickly checked at the close of a day and power terminated to a sub-system (and/or a particular device in the sub-system) via a remote location.

It is also useful to know if a sub-system and/or a device is being properly utilized. If a sub-system is not being used, it can be transferred to a location that is over utilizing its sub-system and/or to a location that does not have a sub-system. As another example, if a sub-system contains 8 devices and only 4 devices are being utilized, the 8 unit sub-system can be moved to a location that can fully utilize the sub-system, and a smaller sub-system with only 4 units can be substituted in its place. This increases the overall efficiency and optimization of the job site assets.

The optional auxiliary component 214 supplements the portable construction devices 1-N 206-208. This can include, but is not limited to, automatic wire feeding devices for welding, monitoring equipment, and/or regulators and the like. Likewise, the portable sub-system 202 can also include the optional GPS component 216 to facilitate in establishing location of the portable sub-system 202 and/or portable construction devices 1-N 206-208. Location information can then be transmitted back to the remote communication device 210 via the communication component 204. This enables a remote job site management center to always know the location of the portable construction devices 1-N 206-208. If a problem should arise (possibly reported via the communication component), service personnel can quickly locate and service any bad units and/or a working unit can be brought immediately to the area. If portable construction device type information, such as model and serial number, are relayed back to the remote site, an exact replacement can be sent to the location and/or the correct supplies/parts can be brought to the location since the exact model of the unit is known.

Although the optional GPS component 216 can determine its location, often it does not have the capability to instruct personnel where it should be located. The optional location indicator component 218 utilizes the optional GPS component 216 location information along with information sent from the remote communication device 210 via the communication component 204 to indicate if the portable sub-system 202 is in the proper location. As an example, if a company is to deliver a plurality of portable sub-systems to a construction job site, it may be highly desirable to have certain sub-systems delivered to predetermined locations. So, an 8-pack unit sub-system might be required to be in location "A" while a 4-pack unit sub-system might be required in location "B." The optional location indicator component 218 can be as simple as a green and red light on a sub-system itself. When in the proper location, the green light is lit and when it is not in the proper location, the red light stays lit. This greatly facilitates in delivering the right equipment to the right location as dictated by the central job site management center. More sophisticated indicator systems can have readouts that indicate distances to proper placement, etc. One skilled in the art can also appreciate that GPS units can determine elevation and, thus, the present invention can utilize this information as well for sub-system placement (such as, for example, in a high-rise construction effort).

Figure 3:
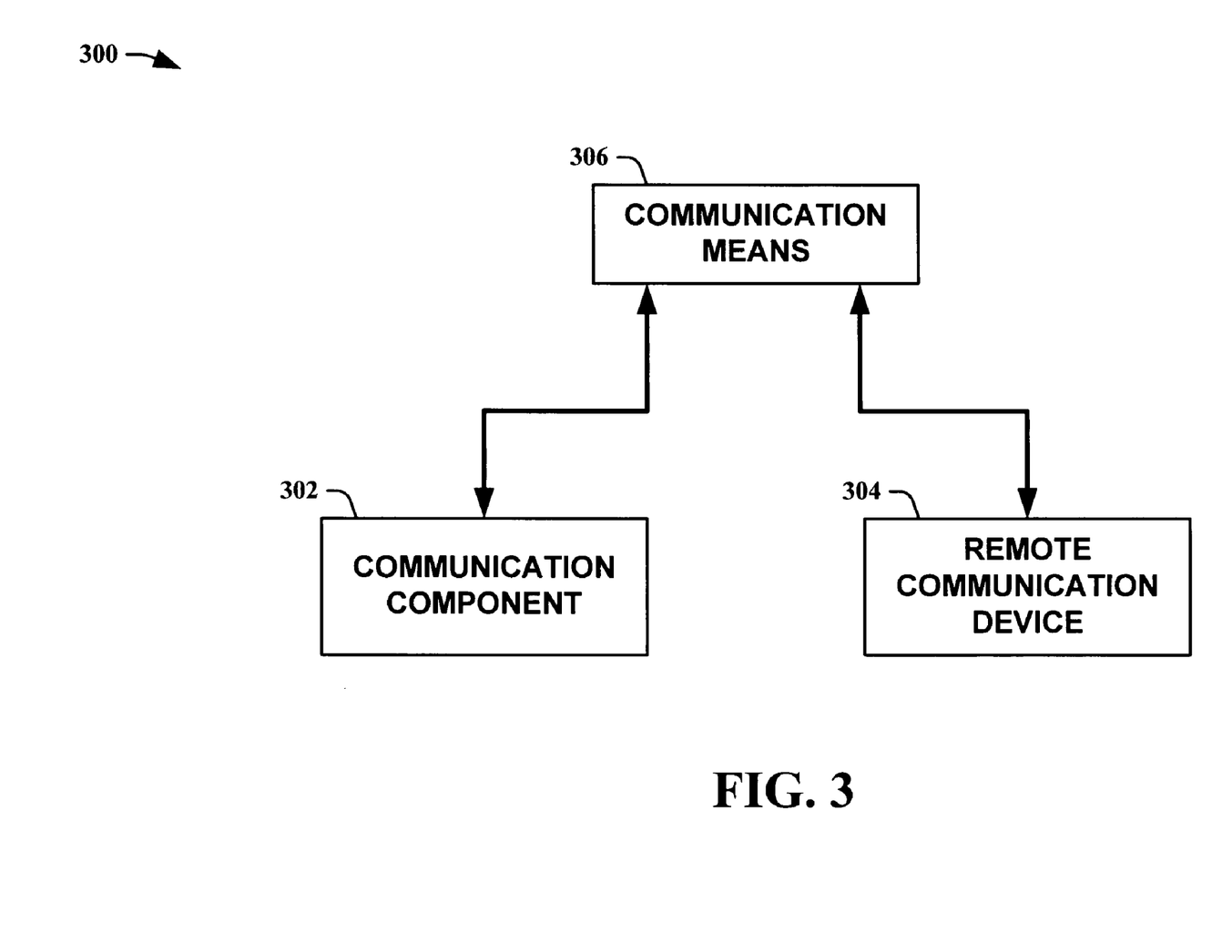
FIG. 3 is an illustration of communication means for a portable construction device management system in accordance with an aspect of the present invention.

Moving on to FIG. 3, an illustration 300 of communication means for a portable construction device management system in accordance with an aspect of the present invention is depicted. The communication component 302 can interact with the remote communication device 304 via a multitude of different communication technologies. Thus, the communication means 306 can include such technologies as wireless technologies, wired technologies, and/or optical technologies and the like. The wireless technologies can include, but are not limited to, radio frequency (RF) technologies, satellite communication technologies, infrared technologies, microwave technologies, cellular technologies, and/or optical technologies and the like. The wireless communication can be accomplished, for example, by utilizing one of a plurality of public domain wireless communication standards and/or a frequency adjusting wireless communication protocol (e.g., to achieve improved noise immunity, such as frequency hopping spread spectrum and/or direct sequence spread spectrum) and the like to facilitate communication with and among portable construction devices. A wireless Ethernet-based system can also be constructed utilizing such technology.

The wired technologies can include, but are not limited to, digital signal technologies, analog signal technologies, and/or Ethernet-based technologies and the like. The optical technologies can include, but are not limited to, glass media and/or plastic media and the like. Thus, the communication means 306 can also include global communication means such as the Internet and the like. If an existing communication structure is available, the present invention is flexible enough to integrate with the available communication structure. Thus, for example, if working within a building that is wired for Ethernet communications, each portable sub-system can connect into the existing Ethernet communication structure and interact with the remote communication device in that fashion. Likewise, frequencies can be interjected into existing power wiring of a building's structure to facilitate in communications as well.

Protocols that can be utilized include a header field to identify new communications packets, a node address field to communicate with selected portable construction devices, a control layer to provide synchronization and/or command information, a data layer to exchange system information with the device, an error check layer to facilitate communications and mitigate errors in communications (e.g., CRC, check sum) and an end packet to signify an end to a communications segment to the portable construction device and/or network of devices. The protocol can include, for example, such commercially available standards such as, for example, Device Net, Control Net and ProfiBus. However, other protocols can also be similarly provided that they include substantially robust performance and substantially fast communications rates to support the control loops operated in accordance with the one or more portable construction devices.

Figure 4:
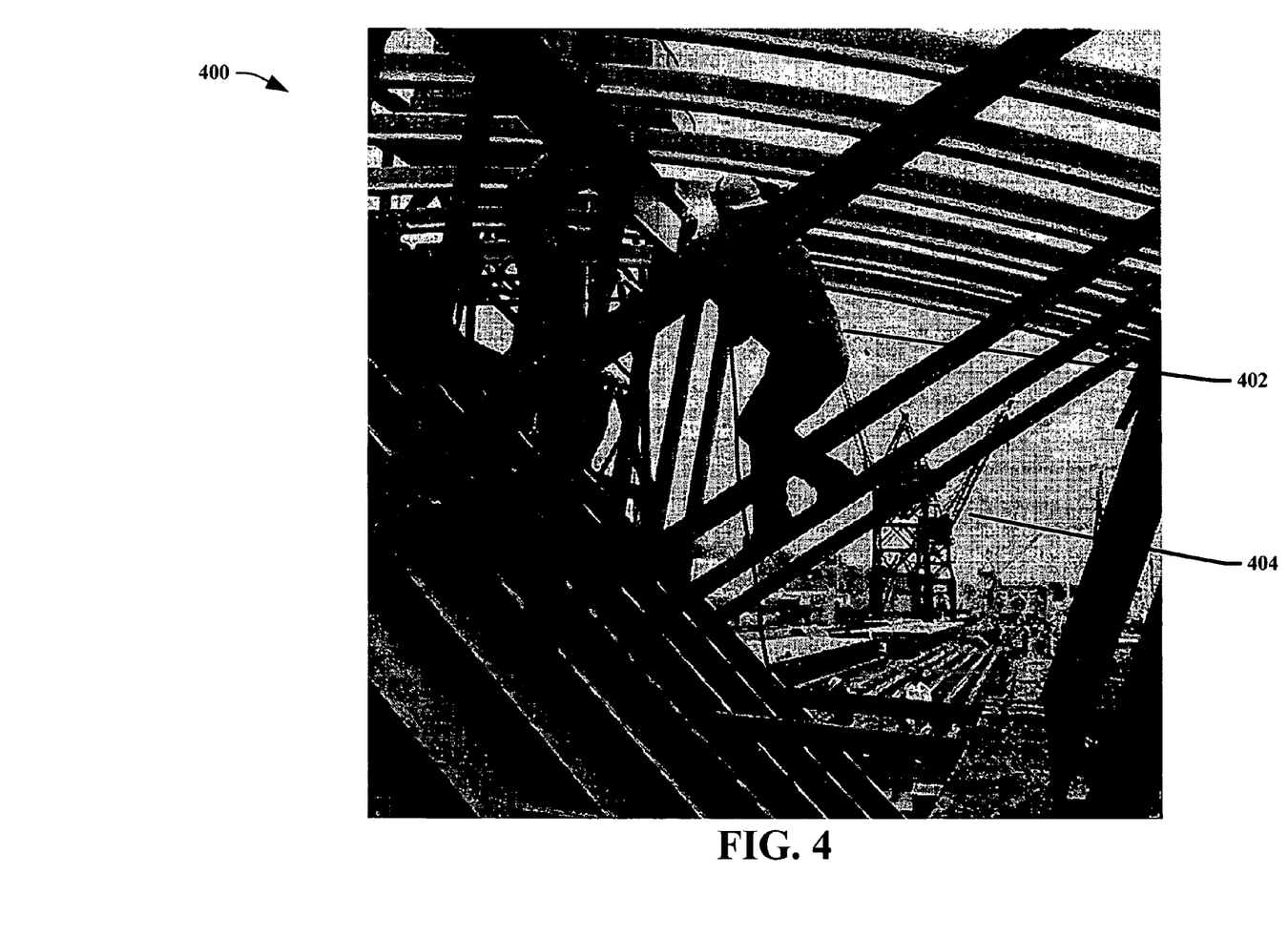
FIG. 4 is an illustration of a construction site that utilizes a portable construction device management system in accordance with an aspect of the present invention.

Looking at FIG. 4, an illustration 400 of a construction site that utilizes a portable construction device management system in accordance with an aspect of the present invention is shown. The illustration 400 shows a man working 402 at a location that is a great distance from a second work site 404 shown in the background. If each location has a portable sub-system to facilitate, for example, in welding beams together, it would take great effort for either operator of a sub-system to know what the other is doing. A central job site management center is even more removed from the picture, so to speak, and would most likely have to radio to each work detail to find out the status of their equipment. These types of interruptions slow down work progress and can even be a safety hazard if a worker is in a precarious position. With the present invention, the workers are not required to constantly monitor their equipment and report back. The remote location can be provided with real-time data relating to the equipment without interrupting the workers. At a glance, the remote site can monitor the workload and productivity of each team using the equipment and adjustments can be made to optimize the utilization of the equipment. Additionally, other instances of the present invention can allow voice communications via the sub-systems between sub-systems and/or the remote management site. Instances of the present invention can also allow communications such as a display terminal that workers can access in order to send and/or receive information between sub-systems and/or the remote management site. Thus, an Internet link can be established as well. Even other instances of the present invention can utilize video to facilitate in interacting with the sub-systems and/or between sub-systems. With better communications, the job site is substantially more productive, safer, and cost beneficial.

Figure 5:
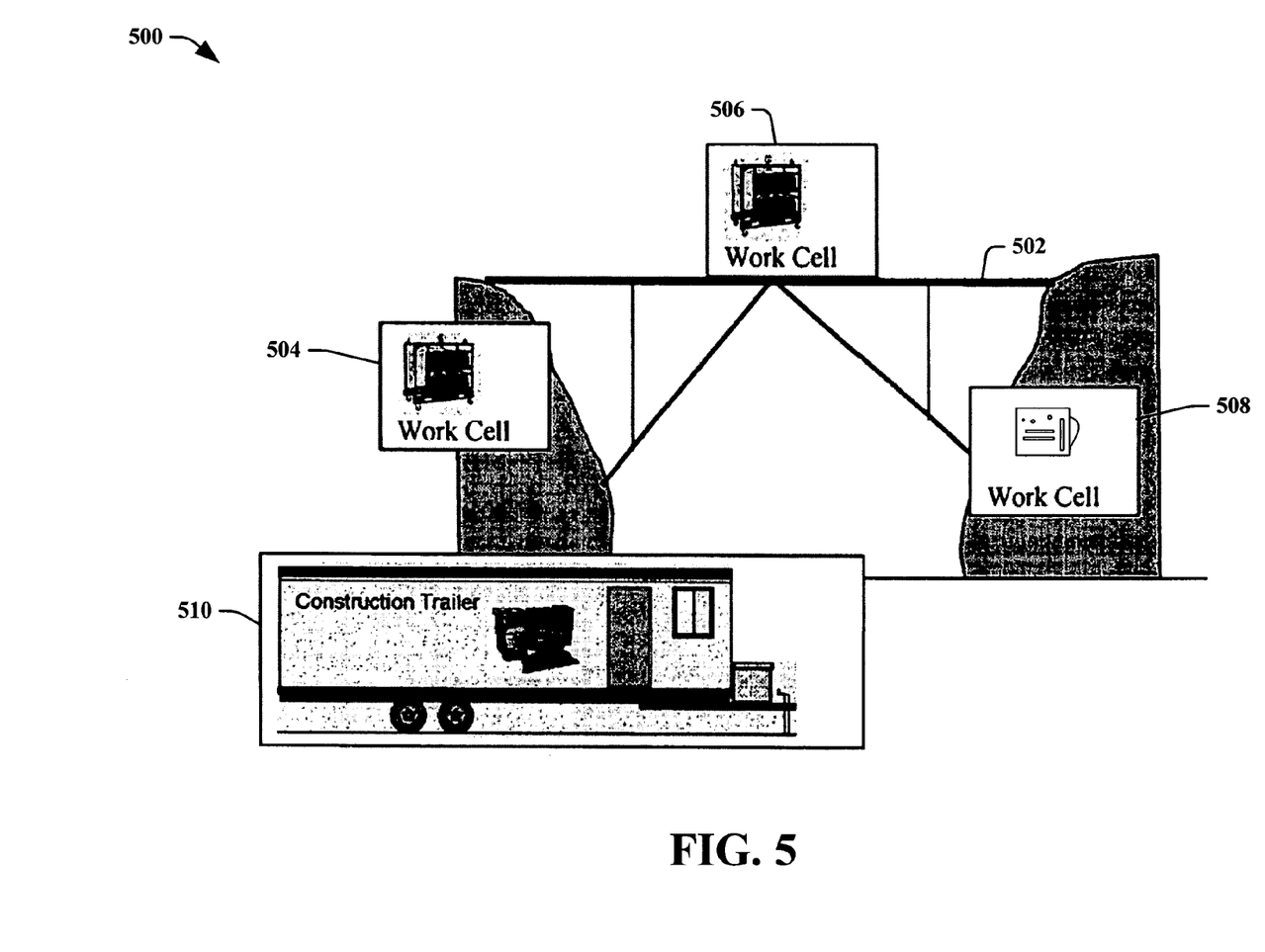
FIG. 5 is another illustration of a construction site that utilizes a portable construction device management system in accordance with an aspect of the present invention.

In FIG. 5, another illustration 500 of a construction site that utilizes a portable construction device management system in accordance with an aspect of the present invention is depicted. The illustration 500 shows construction of a bridge 502 with three work cells 504-508 located at each side of the bridge 502 and at the center of the bridge 502. Work cells 504 and 506 are illustrated as a grouping of portable construction devices, as an example, while work cell 508 is illustrated as a single stand-alone portable construction device. A remote construction management site 510 is shown as a construction trailer. By utilizing the present invention, the remote construction management site 510 can monitor and/or control the work cells 504-508. This includes both monitoring/controlling digitally enhanced devices as well as analog devices. Thus, if a work cell is being underutilized, the management site 510 can direct that it be moved, for example, from the side of the bridge 502 to the center of the bridge 502. Likewise, if at the end of a work day it is noted that the work cell at the center of the bridge is still powered ON, the management site 510 can remotely shut power OFF to the work cell. Not only can this reduce wasting power, it can also increase safety if the work cell is located in a hazardous area that might put a worker in jeopardy just to turn the work cell OFF.

Figure 6:
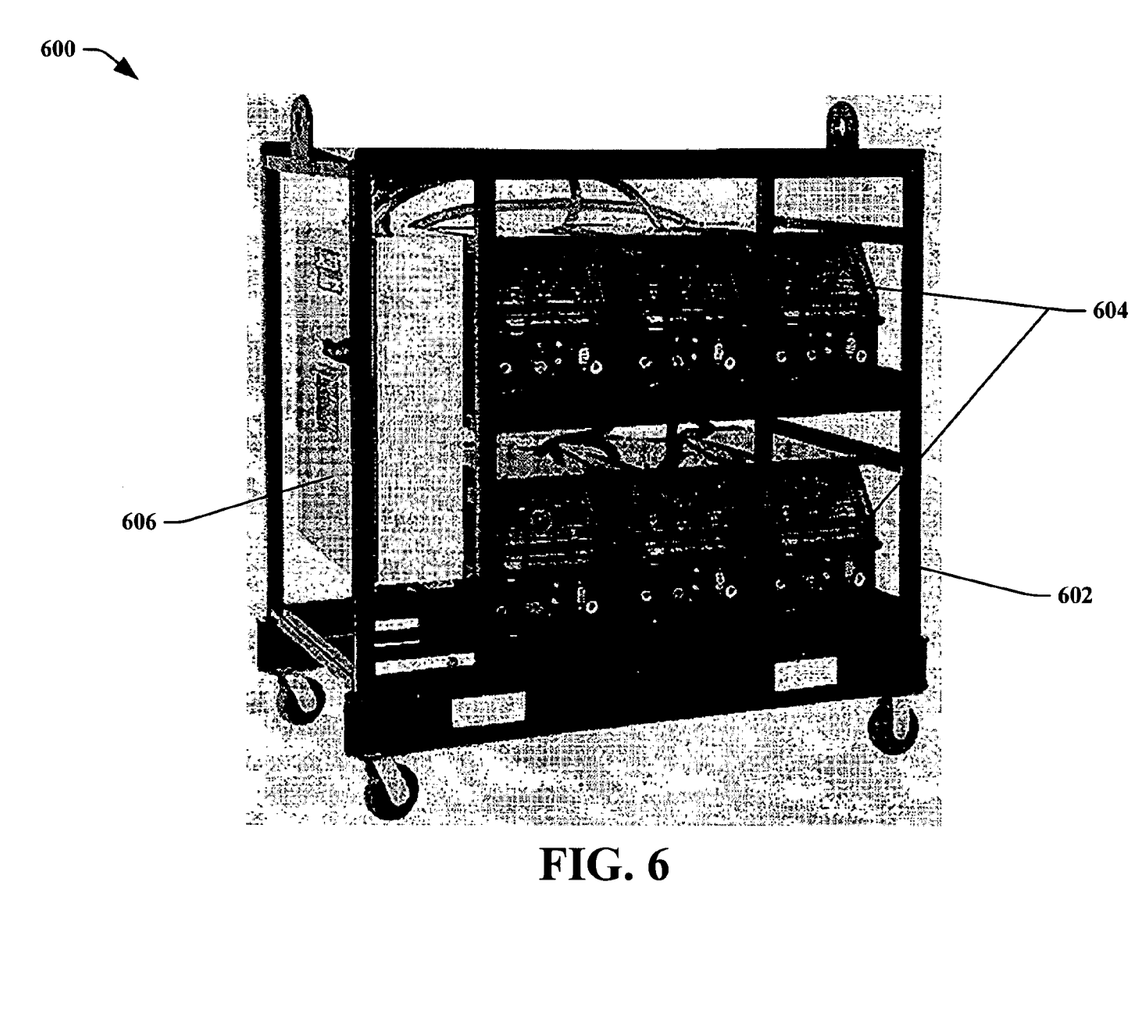
FIG. 6 is an illustration of a portable construction device management system in accordance with an aspect of the present invention.

Referring to FIG. 6, an illustration of a portable construction device management system 600 in accordance with an aspect of the present invention is shown. In this example, the portable construction device management system 600 is comprised of a rack system 602, portable construction devices 604, and a control box 606 that includes a power source and a communication component. The portable construction devices 604 shown are six welding units, three on each level of the rack system 602. The compactness and portability of the unit make it invaluable in remote locations. Typically, the units are self-contained and do not require additional equipment to be fully functional. However, additional components can be included as previously described supra. The present invention greatly enhances the usability and functionality of a portable sub-system, turning it into a portable construction device management system that can afford bi-directional communications, remote monitoring, and/or remote control over the portable construction devices.

The above illustration is but one example of an instance of the present invention. Other instances of the present invention include stand-alone devices such as a gas engine welder and the like. For these instances of the present invention, the communication component can be integral to the device and/or auxiliary to the device. This allows instances of the present invention to be retrofitted to older technologies such as the gas engine welder that might only have analog interfaces via, for example, a voltage pickup and/or a current probe and the like. Thus, for example, one instance of the present invention can utilize an analog interface to interact with the device and provide device related information to a remote location, even for non-digital equipment. These instances include embodiments that utilize rack systems as illustrated in FIG. 6 and/or those that do not utilize rack systems. Still other instances of the present invention can be integrated with the device so that it is an integral part of it. This allows for a more compact and efficient device, increasing its ability to relay information to a remote location. For example, a welding device with software and/or digital circuitry can host the communication component, allowing for integrated communications directly to the remote location from a single stand-alone device. The flexibility of the present invention allows it to be utilized as a network, joining both stand-alone devices and grouped devices alike. This allows integration of old technology with newer technology without discriminating between them, increasing the overall efficiency of communications with a remote location and improving performance as a whole.

Figure 7:
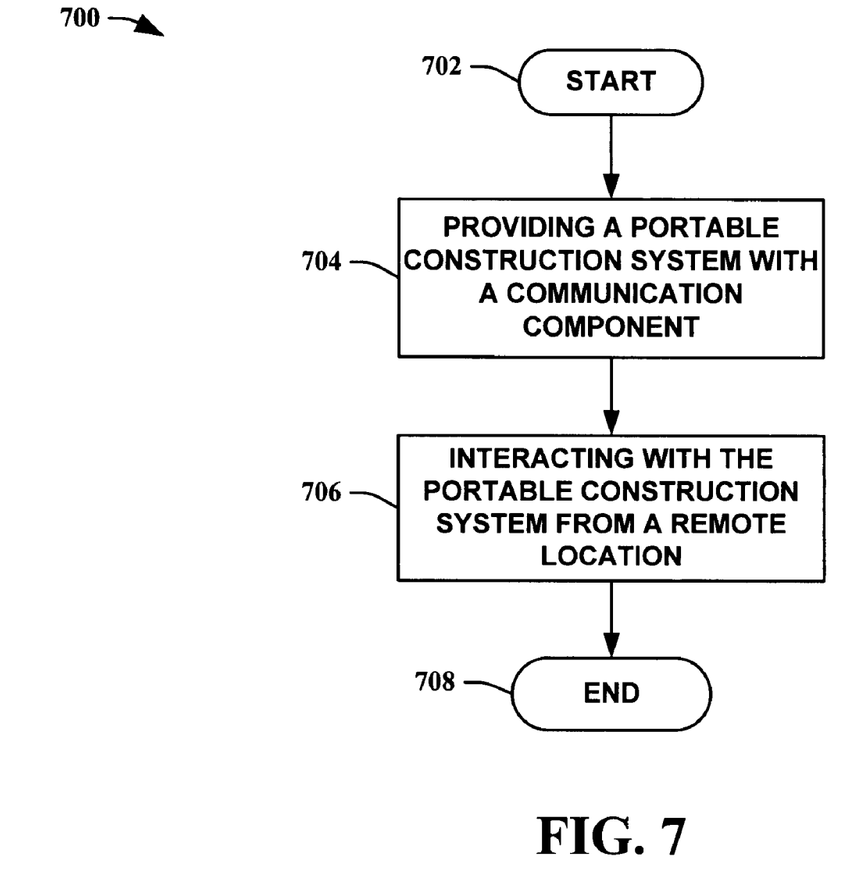
FIG. 7 is a flow diagram of a method of facilitating management of portable construction devices in accordance with an aspect of the present invention.
Figure 8:
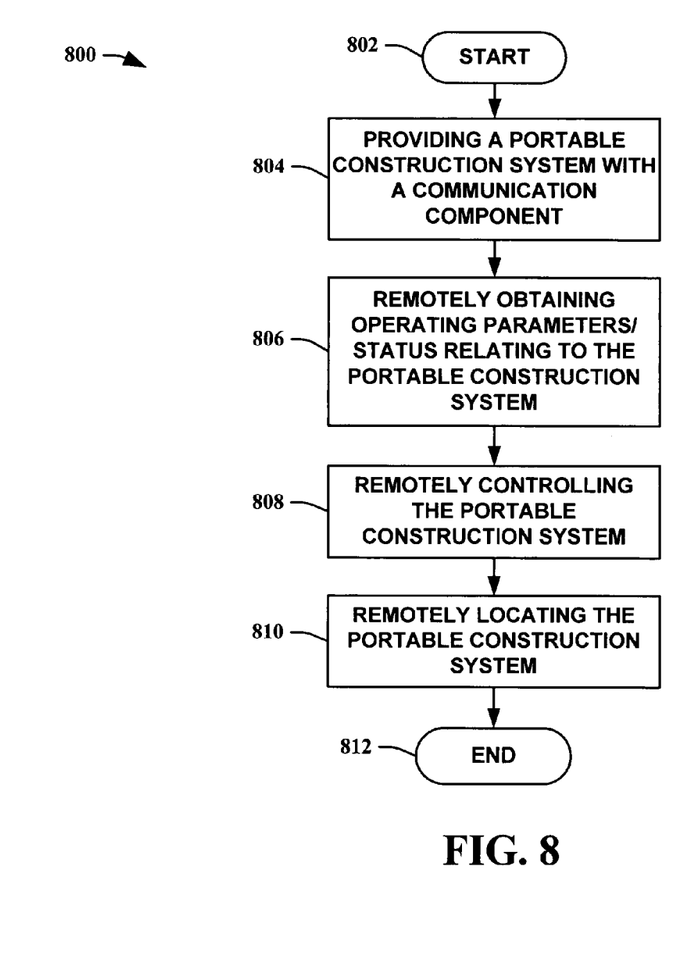
FIG. 8 is another flow diagram of a method of facilitating management of portable construction devices in accordance with an aspect of the present invention.

In view of the exemplary systems shown and described above, methodologies that may be implemented in accordance with the present invention will be better appreciated with reference to the flow charts of FIGS. 7-8. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

In FIG. 7, a flow diagram of a method 700 of facilitating management of portable construction devices in accordance with an aspect of the present invention is shown. The method 700 starts 702 by providing a portable construction system with a communication component 704. The portable construction system can include portable construction devices such as, for example, welding units. The communication component can utilize wired, wireless, and/or optical communication techniques and the like. The portable construction system is then interacted with via the communication component from a remote location 706, ending the flow 708. The interaction can include, but is not limited to, transferring information such as status information and the like and/or receiving control inputs to manipulate the portable construction devices. This allows for the efficiency of single site monitoring and/or controlling multiple portable construction systems via a means such as, for example, a computer at the remote location. This enables supplies, maintenance, communication networks, and/or power control to be instigated remotely, saving time and money.

Referring to FIG. 8, another flow diagram of a method 800 of facilitating management of portable construction devices in accordance with an aspect of the present invention is depicted. Not all of the steps in the infra method are required to be performed to be within the scope of the present invention. The method 800 starts 802 by providing a portable construction system with a communication component 804. Operating parameters and/or status information relating to the portable construction system are obtained remotely via the communication component 804. The portable construction system is then controlled remotely via the communication component 808. The portable construction system is then located remotely via the communication component 810, ending the flow 812. Thus, the present invention provides a method of monitoring, controlling, and/or locating a portable construction system and/or device from a remote site. The remote site can also include other communication components that are co-located with other portable construction systems as well.

What has been described above are various aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A portable construction device management system, comprising:
   an electric arc welder;
   a wireless relay link that remotely monitors usage of the electric arc welder;
   a digital interface that interacts with the wireless relay link to facilitate in monitoring or controlling the electric arc welder;
   a global positioning system (GPS) that determines location information; and
   a location indicator that utilizes information from the GPS along with information sent from the wireless relay link via the digital interface to indicate if the electric arc welder is in a predetermined location.

2. The system of claim 1 further comprising a power generator that supplies power to the electric arc welder and the digital interface.

3. The system of claim 1, the digital interface interacts with the GPS to relay position data to the wireless relay link to direct the GPS to a different location.

4. The system of claim 1, the digital interface controls usage of the electric arc welder based on interactions with the wireless relay link.

5. The system of claim 4, the digital interface and the wireless relay link controls usage of the electric arc welder based on a monetary value determined by operating costs and expendable material usage related to the electric arc welder.

6. The system of claim 1, the digital interface provides one-way communications or two-way communications to the wireless relay link.

7. A method of facilitating management of portable construction devices, comprising:
   employing a processor to execute computer executable instructions stored on a computer readable medium to perform the following acts:
   remotely communicating and monitoring usage of an electric arc welder via a wireless relay link;
   utilizing a digital interface to interact with the wireless relay link to facilitate in monitoring or controlling the electric arc welder;
   determining location information along with positioning information sent from the wireless relay link via the digital interface to indicate if the electric arc welder is in a predetermined location; and
   employing the positioning information to facilitate in positioning the electric arc welder in the predetermined location.

8. The method of claim 7, further comprising utilizing Ethernet to communicate with the electric arc welder and the wireless relay link.

9. The method of claim 7, further comprising supplying power to the electric arc welder and the digital interface via a power generator.

10. The method of claim 9, further comprising controlling power levels and power amounts to the electric arc welder via the power generator.

11. A system that facilitates management of portable construction devices, comprising:
    a gas metal arc welder (GMAW);

an automatic wire feeder that provides additional functionality to the GMAW;
a wired relay link that remotely monitors usage of the GMAW;
an analog interface that interacts with the wired relay link to facilitate in monitoring or controlling the GMAW;
a power generator that supplies power to the GMAW and the analog interface;
a global positioning system (GPS) that determines location information; and
an indicator that employs the location information along with information sent from the wired relay link via the analog interface to indicate if the GMAW is in a predetermined location.

12. The system of claim 11, the analog interface interacts with the GPS to relay position data to the wired relay link to direct the GPS to a different location.

13. The system of claim 11, the analog interface is integral to the GMAW.

14. A method of facilitating management of portable construction devices, comprising:
employing a processor to execute computer executable instructions stored on a computer readable medium to perform the following acts:
remotely communicating and monitoring with a gas metal arc welder (GMAW) for welding via a wired relay link that interacts with the GMAW;
utilizing an analog interface to interact with the wired relay link to facilitate in monitoring or controlling the GMAW;
supplying power to the GMAW and the analog interface;
controlling power levels and power amounts to the GMAW;
determining a current position of the GMAW;
providing an indication if the current position is different from a predetermined position; and
aiding placement of the GMAW at the predetermined location via the indication.

15. The method of claim 14 further comprising:
performing one-way communications or two-way communications between the analog interface and the wired relay link.

16. The method of claim 14, further comprising maintaining the GMAW in a rack.

17. The method of claim 14, further comprising controlling usage of the GMAW based on a monetary value determined by operating costs and expendable material usage related to the GMAW.

18. The method of claim 14, further comprising providing distance information via the indication to aid the placement of the GMAW at the predetermined location.

19. A portable construction device management system, comprising:
a gas tungsten arc welder (GTAW);
an automatic wire feeder for welding that provides additional functionality to the GTAW;
a wireless relay link that remotely monitors usage of the GTAW;
a digital interface that interacts with the wireless relay link to facilitate in monitoring or controlling the GTAW;
a power generator that supplies power and controls power levels and amounts to the GTAW and the digital interface; and
a global positioning system (GPS) that determines location information;
and
a location indicator that utilizes the location information from the GPS along with information sent from the wireless relay link via the digital interface to indicate if the GTAW is in a predetermined location.

20. The system of claim 19, wherein the wireless relay link includes at least one of radio frequency (RF) technologies, satellite communication technologies, infrared technologies, microwave technologies, cellular technologies, or optical technologies.

* * * * *